United States Patent [19]
Ibaraki et al.

[11] Patent Number: 5,635,805
[45] Date of Patent: Jun. 3, 1997

[54] HYBRID VEHICLE

[75] Inventors: Ryuji Ibaraki, Toyota; Yutaka Taga, Aichi-ken; Yoshihiro Kawashima, Okazaki, all of Japan

[73] Assignee: Toyota Jidosha Kabushiki Kaisha, Toyota, Japan

[21] Appl. No.: 495,763

[22] Filed: Jun. 26, 1995

[30] Foreign Application Priority Data

Jun. 29, 1994 [JP] Japan .................................. 6-148375
Jun. 13, 1995 [JP] Japan .................................. 7-145807

[51] Int. Cl.$^6$ ............................ B60L 11/02; B60L 11/10
[52] U.S. Cl. ........................ 318/139; 180/65.4; 417/231
[58] Field of Search ................... 318/139; 290/9, 290/45; 180/65.1, 65.2, 65.3, 65.4, 11, 242, DIG. 5; 417/231, 324

[56] References Cited

U.S. PATENT DOCUMENTS

| | | |
|---|---|---|
| 3,866,433 | 2/1975 | Krug . |
| 3,885,398 | 5/1975 | Dawkins . |
| 4,042,056 | 8/1977 | Horwinski . |
| 4,293,281 | 10/1981 | Lamoreaux . |
| 4,489,242 | 12/1984 | Worst . |
| 4,533,011 | 8/1985 | Heidemeyer et al. . |
| 4,597,463 | 7/1986 | Barnard . |
| 4,667,480 | 5/1987 | Bessler . |
| 5,056,330 | 10/1991 | Isobe et al. . |
| 5,081,365 | 1/1992 | Field et al. . |
| 5,133,302 | 7/1992 | Yamada et al. . |
| 5,247,808 | 9/1993 | Yoshida et al. . |
| 5,249,637 | 10/1993 | Heidl et al. . |

FOREIGN PATENT DOCUMENTS

| | | |
|---|---|---|
| 5-49105 | 2/1993 | Japan . |
| 6-262938 | 9/1994 | Japan . |

*Primary Examiner*—Bentsu Ro
*Attorney, Agent, or Firm*—Oliff & Berridge

[57] ABSTRACT

A hybrid vehicle has a clutch between the engine and the rotational electrodynamic unit. A driving energy transmission mechanism is provided between the clutch and the rotational electrodynamic unit for transmitting driving energy to an appliance such as an alternator. When driving the engine, the clutch is closed by a clutch controlling unit, and the engine makes the rotational electrodynamic unit function as a generator to operate the appliances. When the engine is stopped, the clutch is opened by the clutch controlling means, and the rotational electrodynamic unit is caused to operate as a motor to operate the appliances. In the system where the appliances are driven by the engine, the appliances are kept being operated even after the engine stops. This structure is applicable to both a series hybrid vehicle and a parallel hybrid vehicle.

7 Claims, 13 Drawing Sheets

HYBRID VEHICLE

BACKGROUND OF THE INVENTION

1. Field of the Invention

This invention relates to an electric vehicle (EV) having an engine in combination with a motor as power sources, that is, a hybrid vehicle.

2. Description of the Related Art

An electric vehicle (EV) is a vehicle whose original source of energy is electric power, and is generally driven by the rotational energy of a vehicle driving motor mounted on the vehicle. As a system structure of the electric vehicle, a combination of a vehicle driving motor and an engine is known, and an electric vehicle having such a structure is called a hybrid vehicle. Hybrid vehicles can be grouped into series hybrid vehicles (hereinafter referred to as SHV) and parallel hybrid vehicles (hereinafter referred to as PHV), depending on the connecting relationship between the engine and the vehicle driving motor.

In the SHV, a generator is driven by the engine, and the generated power (from the generator) is used together with power discharged from the battery for driving the vehicle driving motor. The battery can be charged by generated power from the generator or regenerated power from the vehicle driving motor, as well as by an external power supply. In this type of vehicle, the engine is not mechanically coupled with driving wheels, and accordingly, it can be driven within an excellent range of emission and engine efficiency, occasionally allowing the engine to be stopped during travelling. Thus, the SHV has such advantages that the battery does not need to be often charged by an external power supply, and that the vehicle is low pollutive and highly economical.

On the other hand, in one kind of the PHV, the output shaft of the engine is coupled with the output shaft of the rotational electrodynamic unit for assisting the engine. Accordingly, the output torque from the engine and the output torque from the rotational electrodynamic unit are supplied in parallel to the driving wheels (i.e. both torque values are added together and the sum is supplied to the driving wheels). In this structure, for instance, during acceleration, the rotational electrodynamic unit functions as a motor, while during braking, it functions as a generator. More particularly, the rotational electrodynamic unit is capable of supplementing the increase of the required output to the engine (i.e. motor function) for assisting acceleration, and of storing a surplus of the required output to the engine as electric power (i.e. generator function) during braking assist. Additionally, during the braking operation, the braking energy can be collected as electric power and stored in the battery, which obviates the need to often charge the battery from the external power source and results in low pollution and high economy.

These SHV and PHV have another advantage in that travelling can be continued using motor energy even when the engine is stopped due to, for example, fuel shortage or fuel saving. For instance in the SHV, even when the engine is stopped, only generator output is shut down and the vehicle keeps travelling using power supplied from the battery. Also, in the PHV, with a structure in which a clutch is provided between the engine and the rotational electrodynamic unit as is disclosed in Japanese Laid-Open Patent No. Hei 5-49105, opening the clutch causes the engine to stop working as a load, and therefore, the vehicle itself can be kept being driven by output from the rotational electrodynamic unit even after the engine has stopped.

However, in the SHV and PHV, upon stopping the engine, mechanical appliances mounted on the vehicle are no longer operated. Meanwhile, if using the engine only for the operation of the mechanical appliances, the engine revolution speed is decreased up to around the idle speed and the engine efficiency is reduced to as low as 30% of its peak value.

The appliances mounted in the vehicle include, for example, an alternator for appliance battery charge, a pump for a power steering system (P/S), a compressor for an air conditioner (A/C), and a vacuum pump for braking pedal assist. In principle, these appliances can be driven both mechanically and electrically. Mechanical output of the engine is used for mechanically operating the appliances, while generated power from the generator (in the SHV) or rotational electrodynamic unit (in the PHV) is used for electrically operating the appliances. In view of this, the above mentioned inconvenience can be avoid by employing a structure of electrical operation of the appliances using generated power.

However, depending on the selection between mechanical operation or electrical operation of the appliances, the actual configuration of the appliances must be changed. In reality, engine vehicles (having only an engine to supply driving power) are widely manufactured and generally available, and the mechanical activating structure is preferably selected and mass-produced for the appliances. Accordingly, an electrical activating structure for the appliances is expensive compared to the mechanical activating structure, resulting in increased expense for the entire vehicle. It may be possible to add a converter device for converting the generated output into mechanical power and to employ a mechanically driven structure for the appliances. However, this means that the number of the additional electrical devices is increased, also leading to increased cost. Furthermore, depending on the types and functions of the appliances (e.g. in a vacuum pump for braking pedal assist), the energy efficiency of the appliance system can be more preferably maintained by mechanical output of the engine.

SUMMARY OF THE INVENTION

It is the first object of the invention to provide a hybrid vehicle in which, even employing a mechanically driven appliances structure, the stopping of the engine does not prevent the operation of the appliances. This is achieved by switching a driving source of the appliances upon stopping of the engine.

The second object of the invention is to eliminate such situation where the engine operation must be maintained merely for the operation of the appliances, as well as to prevent the appliances from being stopped when the engine stops. This is achieved by providing a separate mechanical driving source for the appliances mounted in the vehicle, other than the engine.

In order to achieve the above mentioned objects, in one aspect of the invention, a hybrid vehicle comprises an engine having an engine shaft, a rotational electrodynamic unit having a shaft coupled with the engine shaft, a first connection/disconnection means for opening and closing shaft-coupling between the engine and the rotational electrodynamic unit, and an appliance driving means for driving at least one appliances, each of the appliances having an appliance shaft, and located on the shaft of the rotational electrodynamic unit between the rotational electrodynamic unit and the first connection/disconnection means. The appliance driving means transmits mechanical output from the engine to the driving shaft of the appliances when the first connection/disconnection means is closed, while it transmits mechanical output from the rotational electrodynamic unit to the driving shaft of the appliance when the first connection/disconnection means is open.

Thus, the shaft coupled between the engine and the rotational electrodynamic unit is opened and closed by the first connection/disconnection means. Since the appliance driving means is provided between the first connection/disconnection means and the rotational electrodynamic unit, in the situation that the first connection/disconnection means is closed, mechanical output from the engine (as well as mechanical output from the rotational electrodynamic unit) can be transmitted via the appliance driving means to the driving shaft of the appliance. On the other hand, with the first connection/disconnection means being open, transmission of the mechanical output from the engine is shut off, and only mechanical output from the rotational electrodynamic unit is transmitted via the appliance driving means to the driving shaft of the appliance. In this structure, even when the engine is stopped, the operation of the appliances can be maintained by the rotational electrodynamic unit, only by opening the first connection/disconnection means, thereby avoiding the situation where the appliances are disabled by the stopping of the engine. During the opening of the first connection/disconnection means, the engine is cut off from the rotational electrodynamic unit, and therefore, no loss is caused by the engine becoming a load.

This structure can be applicable both to the SHV and PHV. When applied to the SHV, the generator driven by the engine is arranged as a rotational electrodynamic unit. The first connection/disconnection means may be a clutch, which is opened when there is no circulation of lubricating oil in the engine and is closed when the lubricating oil starts circulating, resulting in a simplified process for controlling opening and closing of the clutch.

A controller unit suitable for controlling the above described hybrid vehicle is also provided, which makes the first connection/disconnection means open in response to the engine stopping and makes the rotational electrodynamic unit serve as a motor. As a result, the appliances coupled via the appliance driving means are driven by the rotational electrodynamic unit.

When applying this invention to the PHV, another type of controller unit is also provided. In this case, a second connection/disconnection means is provided for connecting and releasing the shaft-coupling between the rotational electrodynamic unit and the driving wheels, which may be a clutch opened and closed in accordance with the pedal manipulation by the driver. The controller unit makes the first connection/disconnection means open in response to the engine stopping, and makes the rotational electrodynamic unit act as a motor only when both the first and second connection/disconnection means are open. Thus, in the PHV in which the shaft of the rotational electrodynamic unit is coupled with the driving wheels, the appliance coupled via the appliance driving means can be driven by the rotational electrodynamic unit even when the engine is stopped, as long as the second connection/disconnection means is open, while preventing power transmission to the driving wheels.

In this invention, even when the first connection/disconnection means is open in response to the engine being stopped, the rotational electrodynamic unit does not function as a motor unless the operation of the appliances is required, thereby restricting energy consumption by the appliances while the engine is stopped (such as battery discharge) and achieving a prolonged driving period solely using the rotational electrodynamic unit.

In another aspect of the invention, a hybrid vehicle comprises an engine, a vehicle driving motor, a battery for supplying electric power to the vehicle driving motor, and an appliance driving motor for mechanically driving the appliances independently from the driving wheels.

In this aspect, the driving wheels are driven by parallel use of output of the engine and output of the vehicle driving motor, or by selectively using either of them. On the other hand, the appliances mounted in the vehicle are mechanically driven by the appliance driving motor. The operation of the appliances by means of the appliance driving motor is independent from the operation of the driving wheels by the vehicle driving motor which is driven by generated power from the rotational electrodynamic unit or discharge power from the battery (in the case of the SHV), or by the engine or vehicle driving motor (in the case of the PHV). Accordingly, the appliances mounted in the vehicle can be driven regardless of the driving condition of the engine, thereby preventing the appliances from being disabled by the engine stopping. It can also prevent the situation where the engine is kept driven only for operation of the appliances. As a result, a vehicle having a low fuel consumption and low emission is achieved, while maintaining high engine efficiency.

DESCRIPTION OF THE PREFERRED EMBODIMENT

<First Embodiment>

Figure 1:
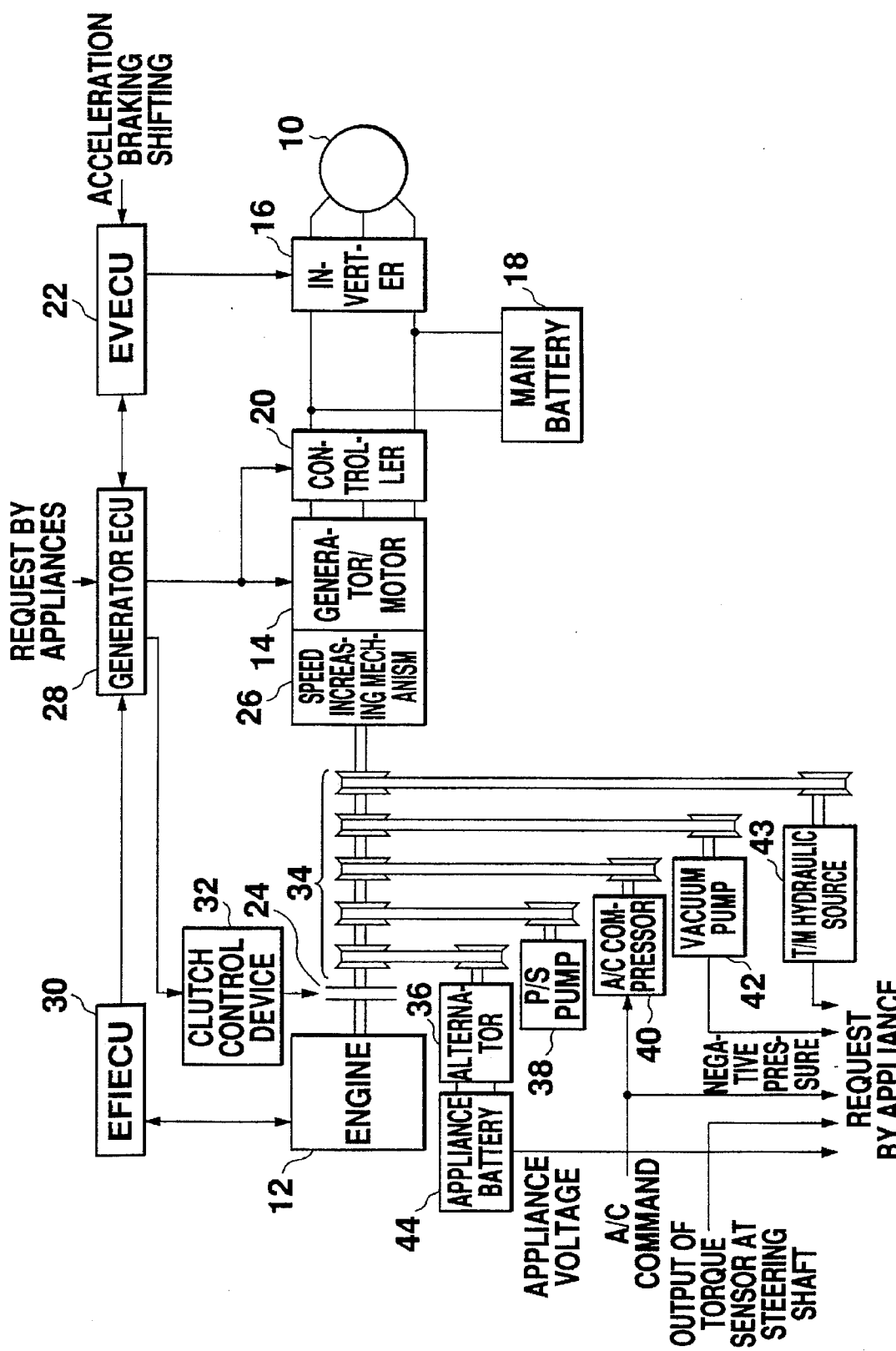
FIG. 1 is a block diagram showing a system structure of a SHV in accordance with the first embodiment of the invention.

FIG. 1 shows a system structure of a SHV in accordance with the first embodiment. The SHV has a three-phase alternating-current motor 10 as a vehicle driving motor. The SHV also has an engine 12 and a generator/motor 14 (capable of functioning as both a generator and a motor) which is mechanically driven by the engine 12.

The vehicle driving motor 10 is driven by an electric supply from a main battery 18, or by generated output from the generator/motor 14 via an invertor 16. The generated output from the generator/motor 14 is rectified by a power controller 20 located next to the generator/motor 14. The power controller 20 has functions of both an invertor and a rectifier, either of which is selected in response to a command from the generator electronic control unit (ECU) 28. The generated output rectified by the power controller 20 or discharged output from the battery 18 is converted by the invertor 16 into three-phase alternating current, which is then supplied to the vehicle driving motor 10 as driving power. When the necessary electric power required for driving the motor 10 is larger than the actual generated output from the generator/motor 14, the shortage is supplemented by discharge output from the main battery 18. On the contrary, when the required electric power for driving the motor 10 is smaller than the generated output from the generator/motor 14, the main battery 18 is charged by the surplus. The EVECU (electric vehicle electronic control unit) 22 controls the operation of the invertor 16 in accordance with acceleration manipulation, braking manipulation, shifting manipulation, etc. so as to derive necessary torque output from the vehicle driving motor 10.

The generator/motor 14 is shaft-coupled via a clutch 24, a speed increasing mechanism 26, etc. with the engine 12. When the clutch 24 is closed, the shaft output from the engine 12 is increased by the speed increasing mechanism 26 and then input to the generator/motor 14. At this time, if field current has been supplied from the generator ECU 28 to the generator/motor, the generator/motor 14 acts as a generator. The resultant generated output is supplied via the controller 20 to the invertor 16. In this case, the generator ECU 28 controls the switching devices inside the controller 20 to construct a diode bridge so as to cause the controller 20 to function as a rectifier.

The engine 12 and the generator/motor 14 are controlled by the EFI(electronic fuel injection)ECU 30 and the generator ECU 28, respectively. That is, the EFIECU 30 not only controls fuel injection of the engine 12, but also detects the revolution speed of the engine 12 to feed back the resultant data to the generator ECU 28. When the engine 12 is actuated, the generator ECU 28 determines a necessary value of the generated power required for driving the vehicle driving motor 10 and for maintaining the state of charge of the main battery 18, on the basis of the information supplied from the EVECU 22 at about, for example, the average power of the motor 10. The generator ECU 28 supplies field current corresponding to the decided necessary power to the generator/motor 14 to control the generated power of the generator/motor to the target value (i.e. a decided necessary power). Since the engine 12 is generally driven a wide open throttle in order to obtain desirable emission and fuel consumption, the revolution speed of the engine 12 can be controlled by controlling the generated power of the generator/motor 14 to the target value. The generator ECU 28 controls the revolution speed of the engine 12 using the value of the engine revolution speed supplied from the EFIECU 30.

When the value of the engine revolution speed supplied from the EFIECU 30 becomes substantially "0", the generator ECU 28 issues a command to the clutch control device 32 (including an actuator etc.) to open the clutch 24, and at the same time supplies a switching signal to the controller 20 to switch its function from a rectifier to an invertor. For instance, by alternately switching the switching elements inside the controller 20, the controller 20 is operated as an invertor. In this condition, the discharged power from the battery 18 is converted to three-phase alternative-current which is then supplied as driving power to the generator/motor 14. At this time, the generator/motor 14 functions as a motor, and its mechanical output is supplied via the speed increasing mechanism 26 to the driving power transmission mechanism 34. The driving power transmission mechanism 34 transmits mechanical output of the generator/motor 14 to various mechanical appliances, such as an alternator 36, a P/S pump 38, an A/C compressor 40, a vacuum pump 42 for braking assist, a hydraulic source 43 for the transmission (T/M), and so on, thereby allowing the appliances to be driven in spite of the fact that the engine 12 is stopped.

Figure 2:
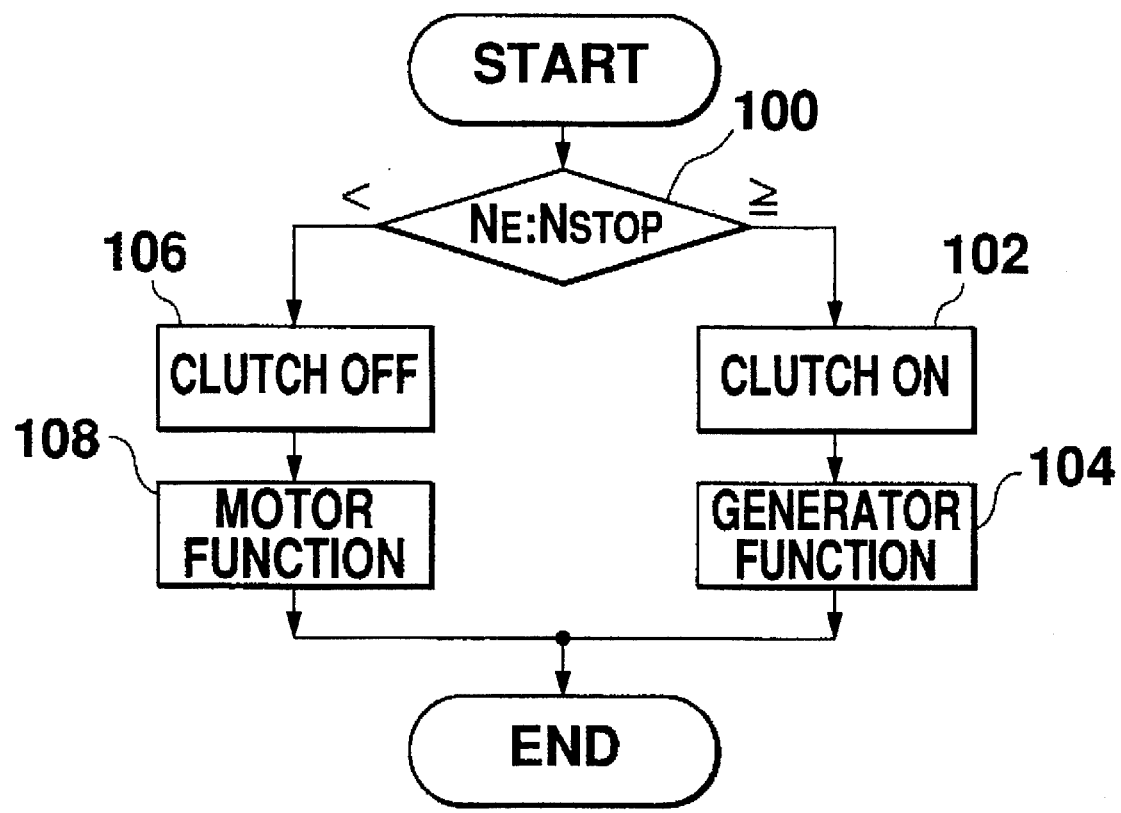
FIG. 2 is a flow chart showing an operation example of the generator ECU used in the system shown in FIG. 1.

An operational example of the generator ECU 28 is shown in FIG. 2. The generator ECU 28 determines the engine condition based on the revolution number $N_E$ supplied from the EFIECU 30 (Step 100). More particularly, the engine revolution number $N_E$ is compared with a very low, a threshold value $N_{stop}$ for example set to 50 rpm. If the comparison result is $N_E \geq N_{stop}$, it is determined that the engine 12 is not stopped, and the generator ECU 28 supplies a command to the clutch control device 32 to maintain the clutch 24 to be in the ON state (Step 102), and continuously operates the generator/motor 14 as a generator (Step 104).

On the other hand, if it is determined that $N_E$ is smaller than $N_{stop}$ (i.e. $N_E < N_{stop}$), the generator ECU 28 supplies a command to the clutch control device 32 to cause the clutch 24 to be in the OFF state (106), and operates the generator/motor 14 as a motor (108). Also, the generator ECU 28 switches the function of the controller 20 from a rectifier to a invertor, and controls the field current of the generator/motor 14 so as to obtain a necessary mechanical output required for driving the appliances.

Figure 3:
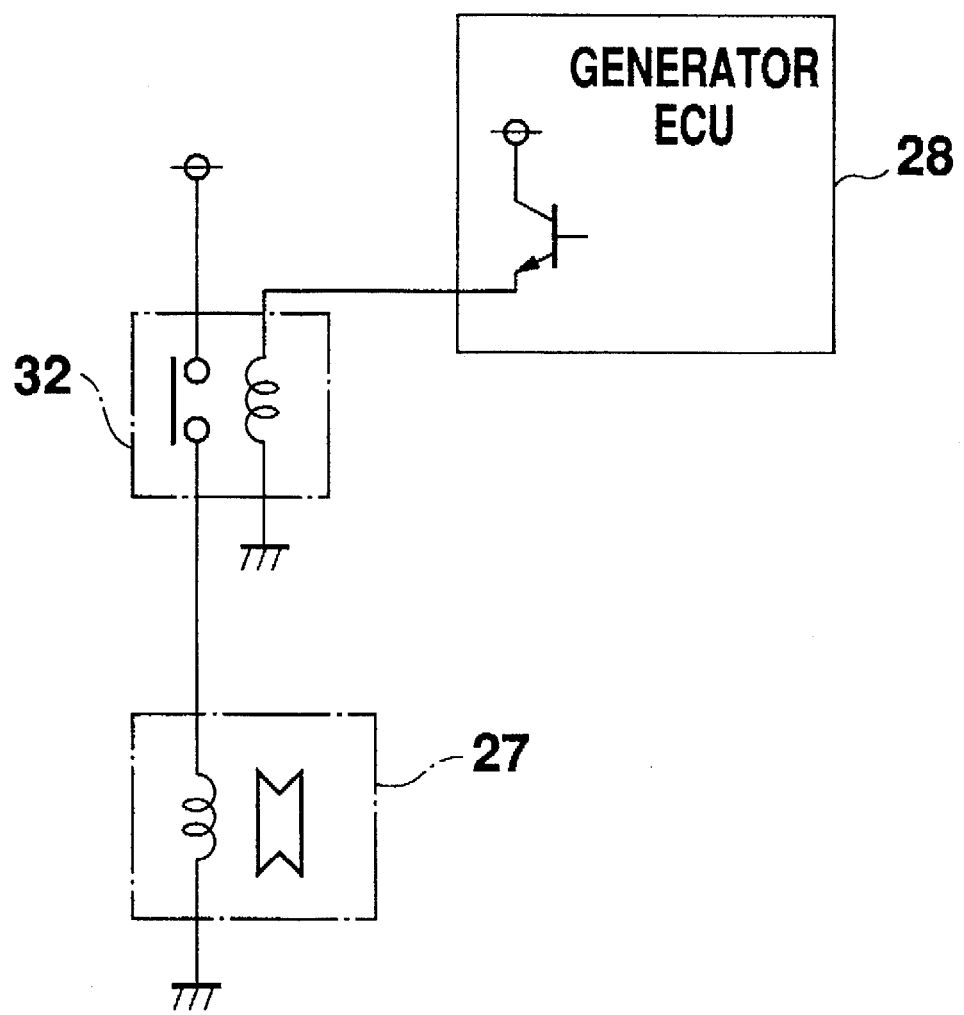
FIG. 3 is an structural example of a clutch control device.

FIG. 3 shows a structure of the clutch control device 32 which is suitable for the ECU operation shown in FIG. 2. In this structure, the clutch 24 is an electromagnetic clutch which is switched ON and OFF in response to the presence or absence of electric excitation. The clutch control device 32 is constructed as a relay for controlling the opening and closing of the electric excitation to the clutch 24, and the generator ECU 28 controls electric excitation to the clutch control device 32 as is necessary for the ON/OFF control of the clutch 24.

Figure 4:
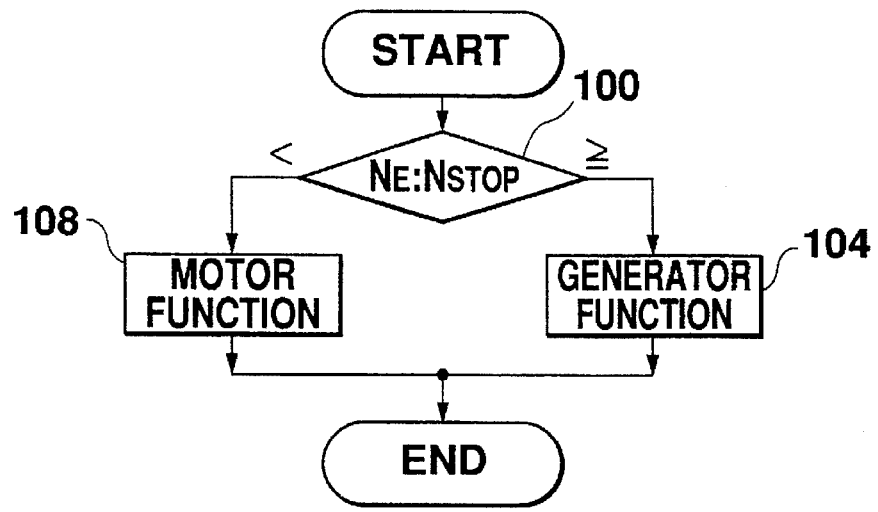
FIG. 4 is a flow chart showing another operational example of the generator ECU.

FIG. 4 shows another operational example of the generator ECU 28. In this example, steps 102 and 106 (ON/OFF operation of the clutch 24) of the previous example are omitted. The reduction in the number of operation steps is realized in the case that the clutch 24 is constructed as a hydraulic clutch actuated by oil pressure supplied by the lubricating oil circulation pump 45 provided on the output shaft of the engine 12 (see FIG. 5). When the oil pressure is generated in the lubricating oil circulation pump 45 (that is, when the engine 12 is driven), the clutch 24 is made ON, while when the oil pressure is not generated in the pump 45 (that is, when the engine 12 is stopped), the clutch 24 is made OFF. In this structure, the clutch 24 is automatically made OFF in response to the stopping of the engine 12, which can eliminate the necessity of supplying a control signal for the ON/OFF control of the clutch 24 from the generator ECU 28, and can enable the omitting of the clutch control device 32 shown in FIG. 1.

Figure 6:
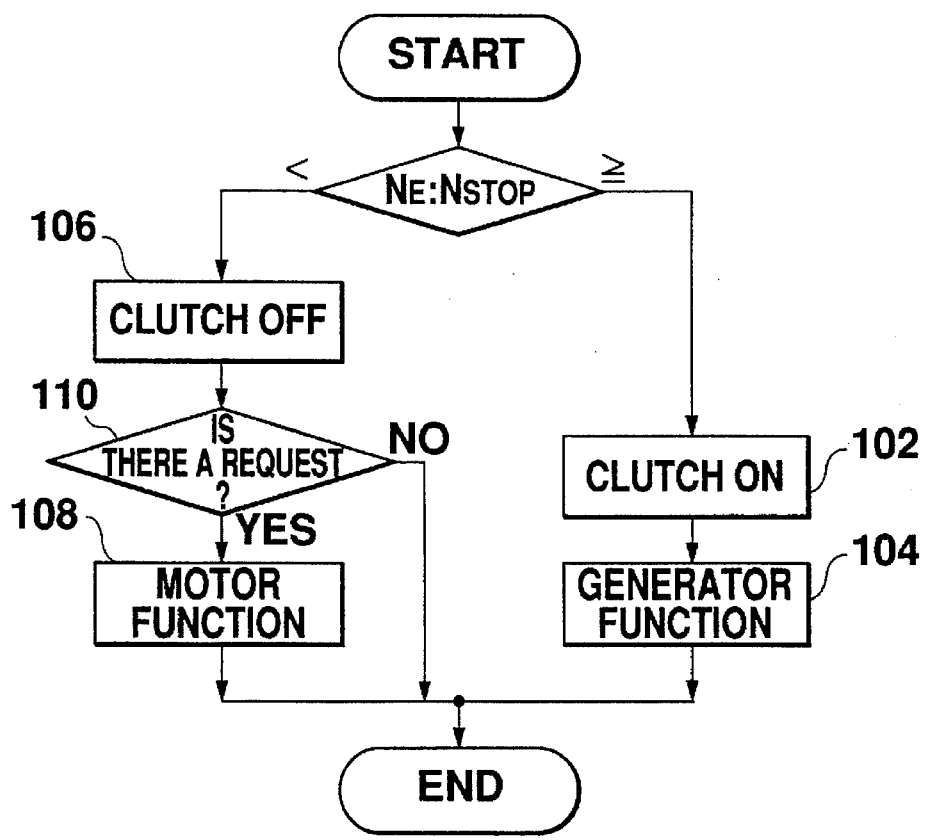
FIG. 6 is a flow chart showing still another operational example of the generator ECU.

FIG. 6 shows still another example of operation of the generator ECU 28. In this case, it is checked in step 110 whether or not there is a request from the appliance. Even when the engine 12 is stopped, the action to function the generator/motor 14 as a motor is not carried out unless the request is presented by the appliances. Accordingly, it can prevent wasteful discharge of the main battery 18 when the engine 12 is stopped. Whether or not a request is presented by the appliance is detected by the behavior of, for example, a voltage of the appliance battery 44 charged by the alternator 36, a output of the torque sensor at the steering shaft, a command to the A/C compressor 40, a negative pressure of the vacuum pump 42, or an oil pressure of the hydraulic source 43. Although in this example the electromagnetic clutch shown in FIG. 3 is used as a clutch 24, the hydraulic clutch shown in FIG. 5 can be used, which make it possible to omit the steps 102 and 106 as well as the clutch control device 32.

<Second Embodiment>

Figure 7:
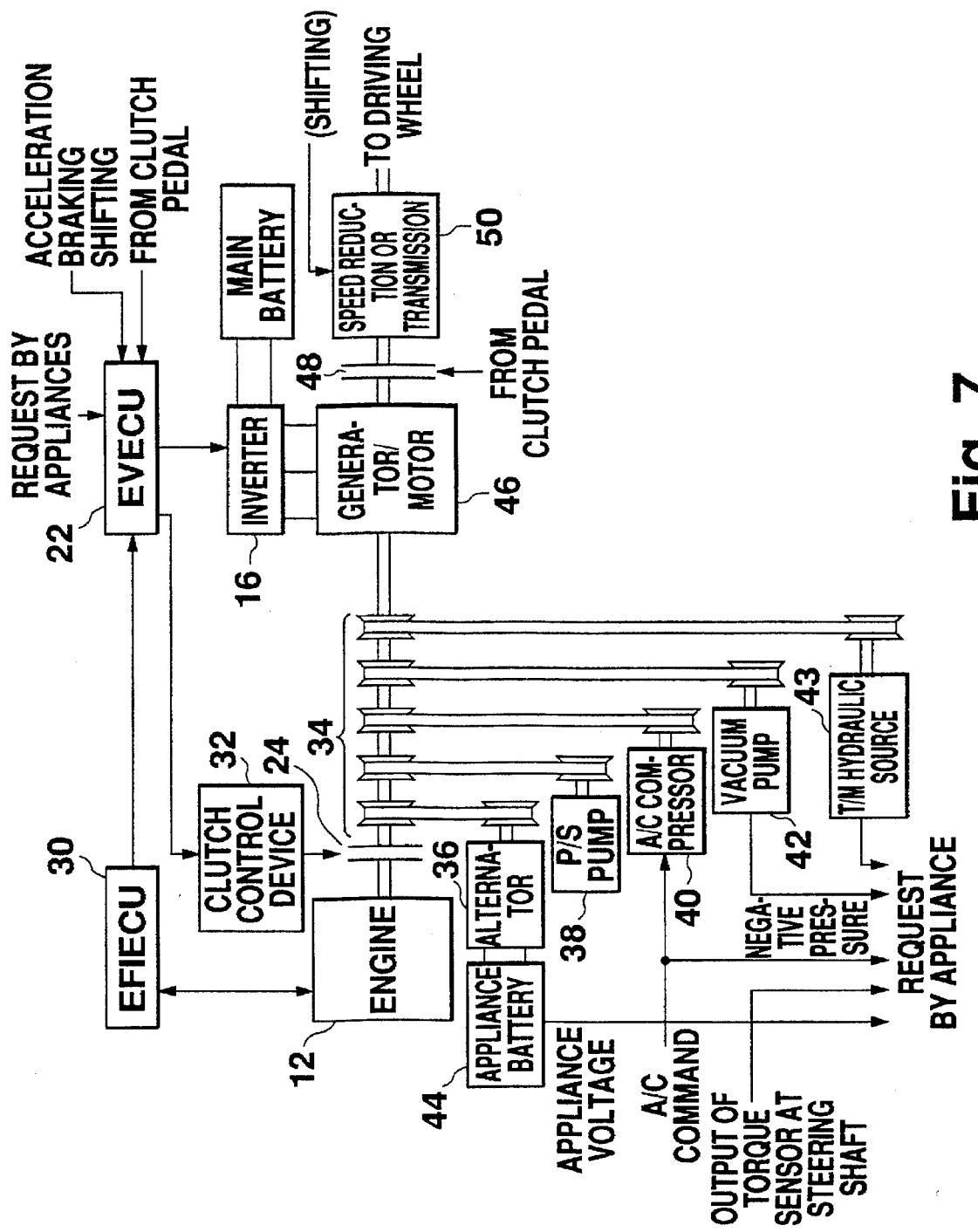
FIG. 7 is a block diagram showing a system structure of a PHV in accordance with the second embodiment of the invention.

FIG. 7 shows a structure of a PHV in accordance with the second embodiment of the invention. The same numerals are assigned to the same elements as the first embodiment. In the PHV, the output shaft of the engine 12 is coupled via the clutch 24 to the shaft of the generator/motor 46. The shaft of the generator/motor 46 is also coupled via the clutch 48 to the shaft of the transmission mechanism (or speed reduction mechanism) 50, which is then coupled to the driving wheels (not shown). The clutch 48 is connected or released in accordance with manipulation of the clutch pedal. The driving power transmission mechanism 34 may be provided between the generator/motor 46 and the clutch 48. The main battery 18 may be replaced by a capacitor having a large capacitance.

Figure 8:
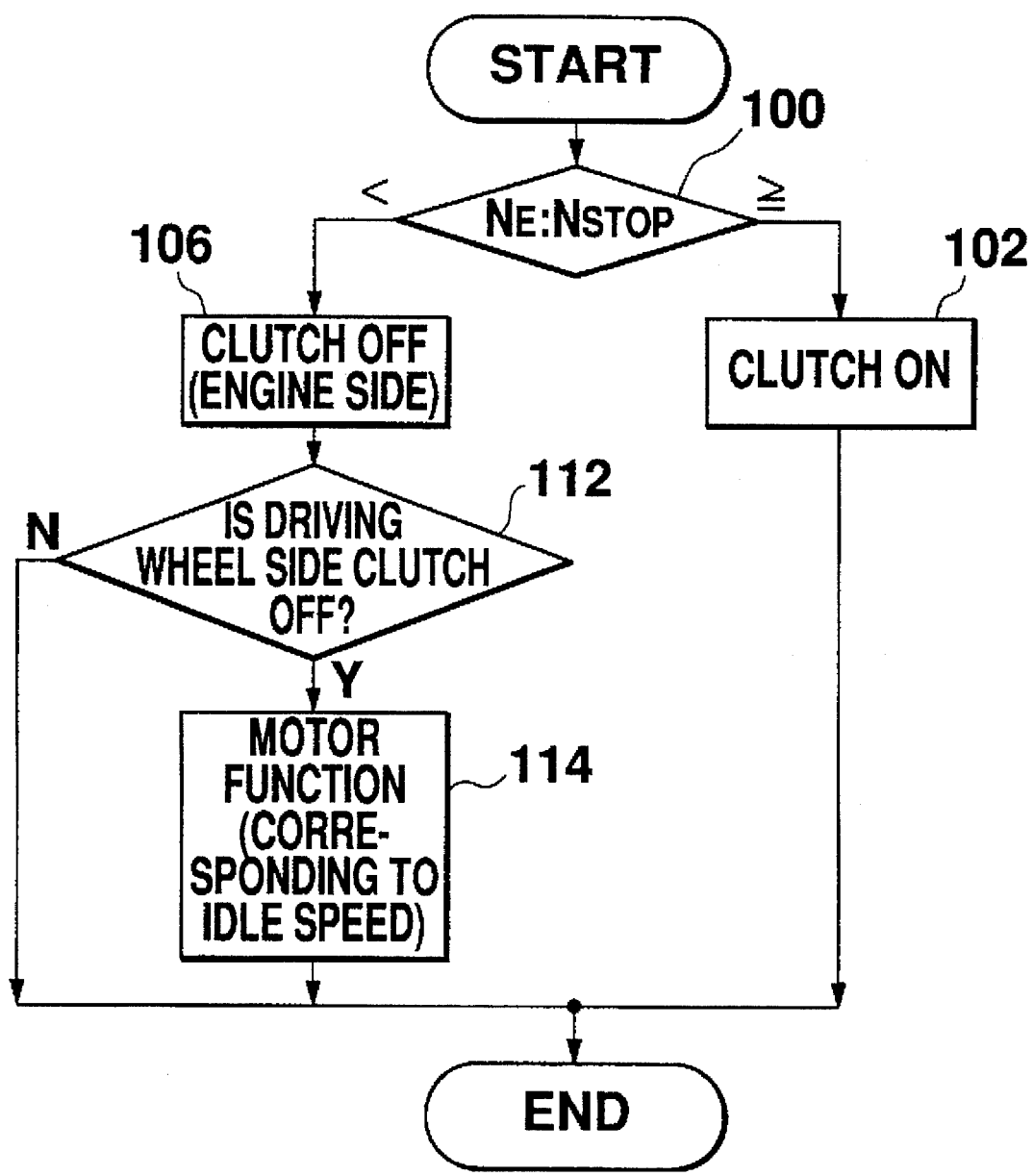
FIG. 8 is a flow chart showing an example of the operation of an EVECU of the second embodiment.

FIG. 8 shows an operational example of the EVECU 22 used in this embodiment. If it is determined that $N_E \geq N_{stop}$ (100), the generator ECU 28 supplies a command to the clutch control device 32 to make the clutch 24 ON (102). It is assumed that the clutch 24 is an electromagnetic clutch of FIG. 3. On the other hand, when it is detected that the engine revolution number $N_E$ supplied from the EFIECU 30 satisfies the condition of $N_E < N_{stop}$, the EVECU 22 supplies a command to the clutch control device 32 to make the clutch 24 OFF (106). The EVECU 22 further determines whether or not the clutch 48 is cut off based on a signal supplied from the clutch pedal (112). If it is determined that the clutch 48 is OFF, the generator/motor 46 is caused to function as a motor (114). The motor revolution at this time is low so that it is almost equivalent to the idle speed of the engine 12. If it is determined that the clutch 48 is not cut off, step 114 is not carried out.

Similarly to the first embodiment, each of the appliances can be driven even when the engine 12 is stopped. When the clutch 48 is ON, the vehicle can travel continuously because the revolution speed of the generator/motor 46 is not reduced to the value corresponding to the idle speed of the engine 12.

Figure 9:
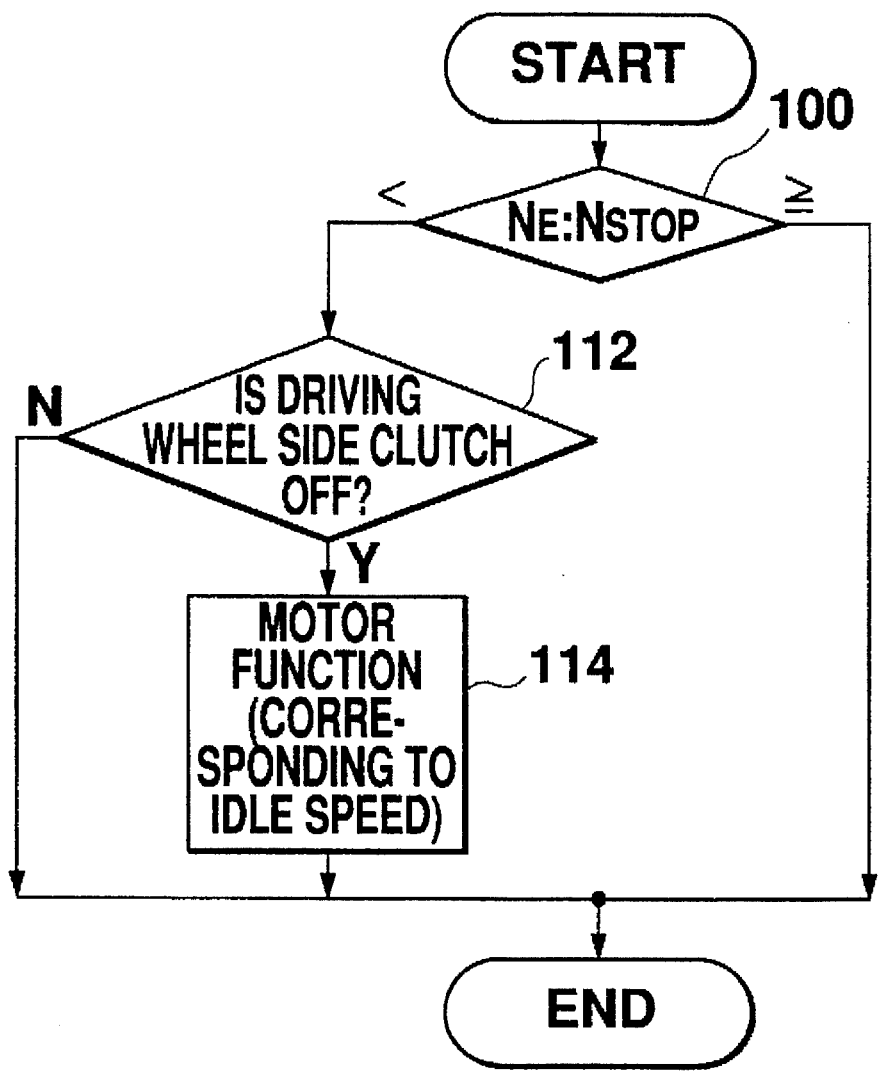
FIG. 9 is a flow chart showing another example of the operation of the EVECU of the second embodiment.

FIG. 9 shows another operational example of the EVECU 22. In this example, a hydraulic clutch, which is actuated by the oil pressure of the lubricating oil circulation pump 45 for the engine 12, is used as a clutch 24, and therefore, steps 102 and 106 are omitted.

Figure 5:
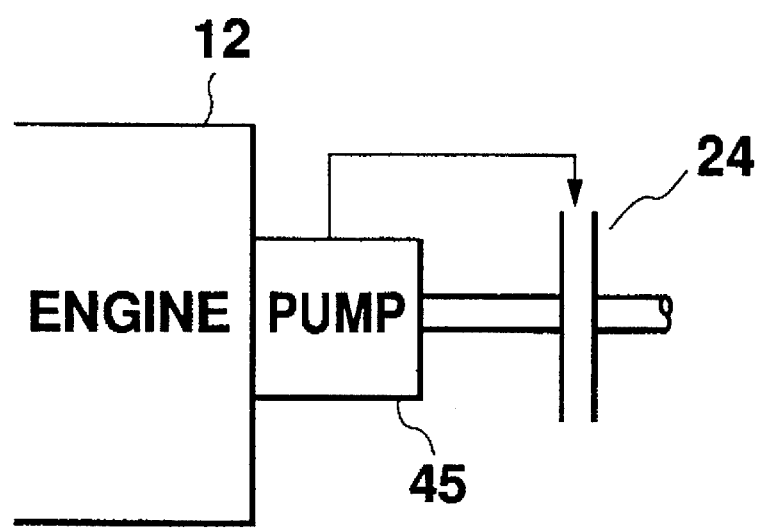
FIG. 5 is a block diagram showing another example of a clutch.
Figure 10:
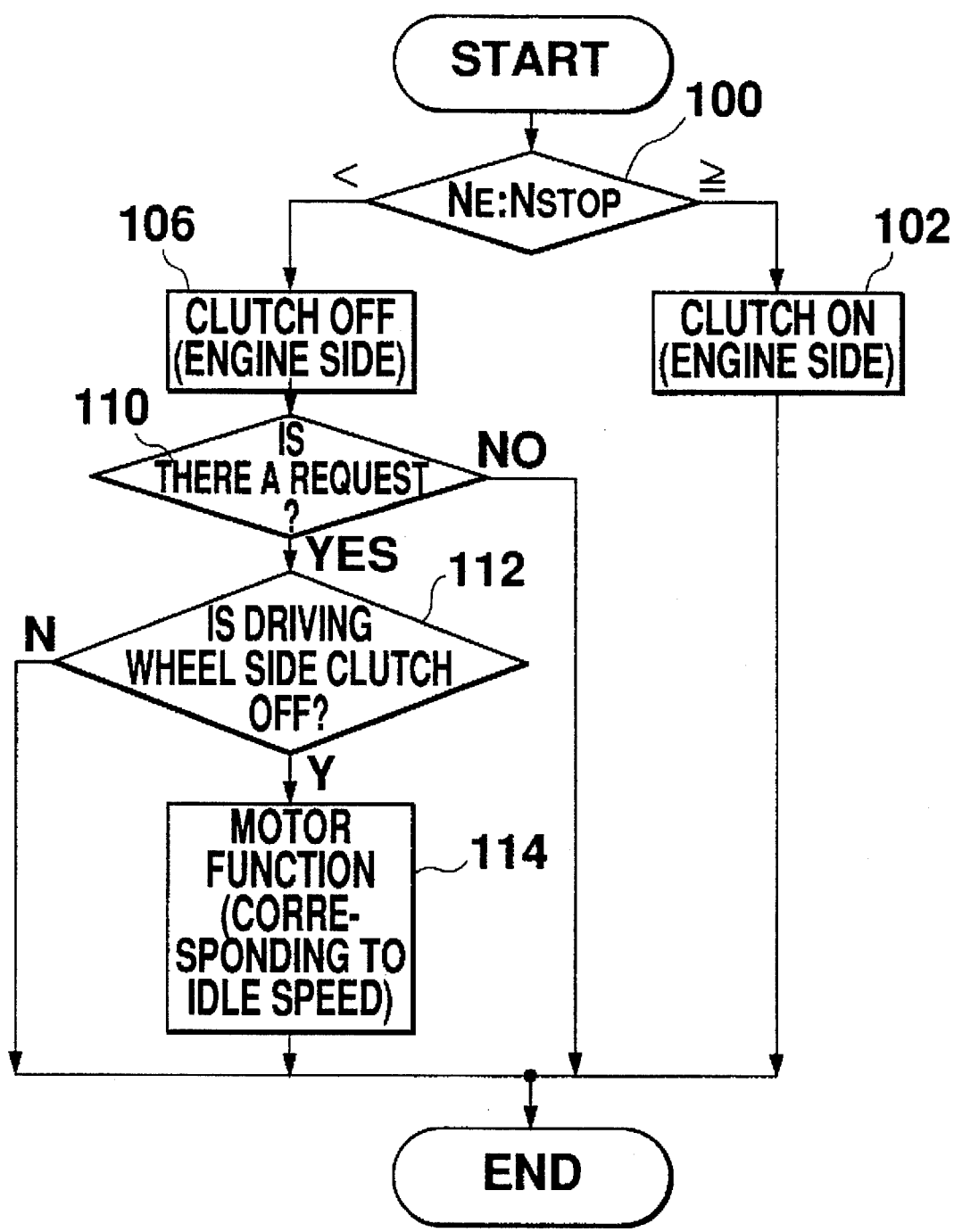
FIG. 10 is a flow chart showing still another example of the operation of the EVECU of the second embodiment.

FIG. 10 shows still another example of the operation of the EVECU 22. In this example, even if $N_E < N_{stop}$ is satisfied, the action to operate the generator/motor 46 as a motor at a low revolution speed corresponding to the idle speed of the engine 12 is not taken unless a request from the appliances occurs (110). This means that the EVECU 22 can control the generator/motor 46 in accordance with the request from the appliances. Of course, by using a hydraulic clutch as shown in FIG. 5, steps 102 and 106, as well as the clutch controlling unit 32, can be omitted.

Although, in this embodiment, the driving power transmission mechanism 34 is provided between the clutch 24 and the generator/motor 46, it may be provided between the generator/motor 46 and the clutch 48 (driving wheel side). Thus, the appliances are driven by the engine 12 when it is actuated, and are driven by the generator/motor 46 when the engine is stopped.

In this embodiment, the revolution speed of the generator/motor 46, when it is operated as a motor when the engine is stopped, is set to the value corresponding to the idle speed of the engine 12. However, it is not limited to the value corresponding to the idle speed of the engine 12, but can be set to any value as long as it is capable of driving the appliances.

<Application to the control during parking>

Figure 11A:
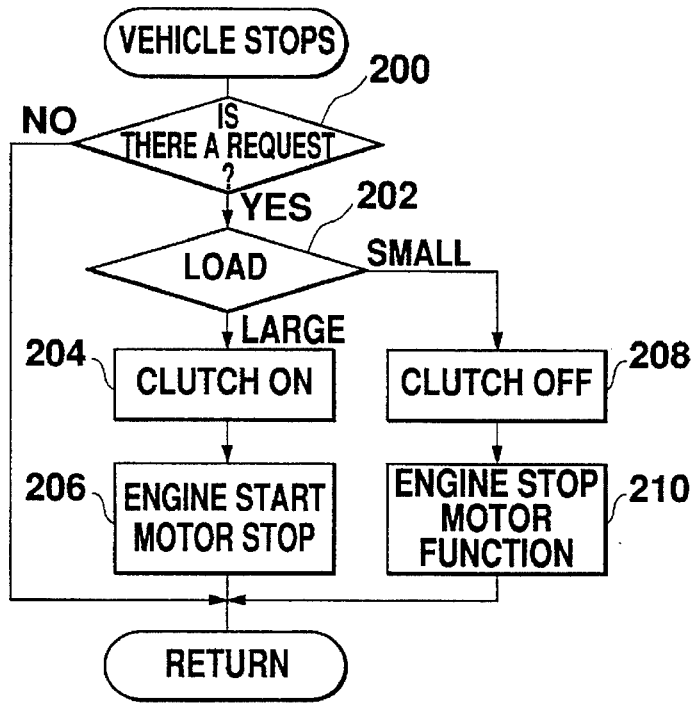
FIG. 11A is a flow chart showing an operational example of the generator ECU when the vehicle is stopped in the first embodiment.
Figure 11B:
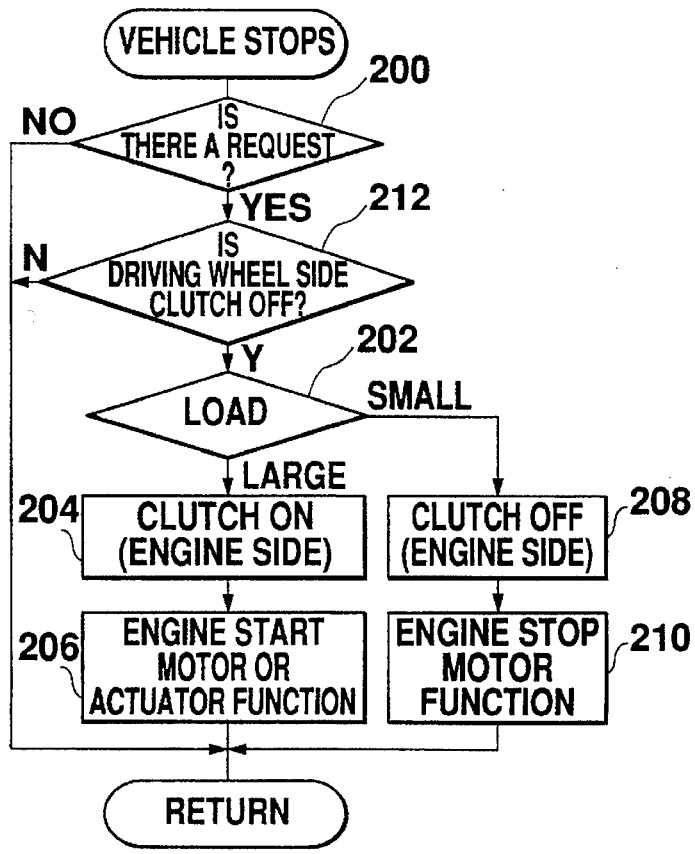
FIG. 11B is a flow chart showing an operational example of the EVECU when the vehicle is stopped in the second embodiment.

The foregoing is described in connection with stopping of the engine caused by, for example, fuel shortage. However, this invention can be applicable to such a situation where the vehicle is parked while operating the appliances. As is shown in FIGS. 11A and 11B, when the vehicle is stopped or parked, it can be determined whether or not there is a request to operate the appliances (200). If there is such a request, the load value of the appliance is detected (202). If the load is large, the clutch 24 is caused to be ON to actuate the engine 12 (204, 206), while if the load is small, the clutch 24 is caused to be OFF to stop the engine 12 (208, 210). In this sequence, the frequency of driving the engine 12 is decreased, thereby improving fuel consumption and emission. In the case of the PHV (FIG. 11B), by operating the generator/motor 46 as a generator (206), the surplus of the output of the engine 12 can be used to charge the main battery 16. In step 212, it is determined whether or not the clutch 48 (of the driving wheel side) is OFF, prior to the start of the engine 12.

<Third and Fourth Embodiments>

Figure 12:
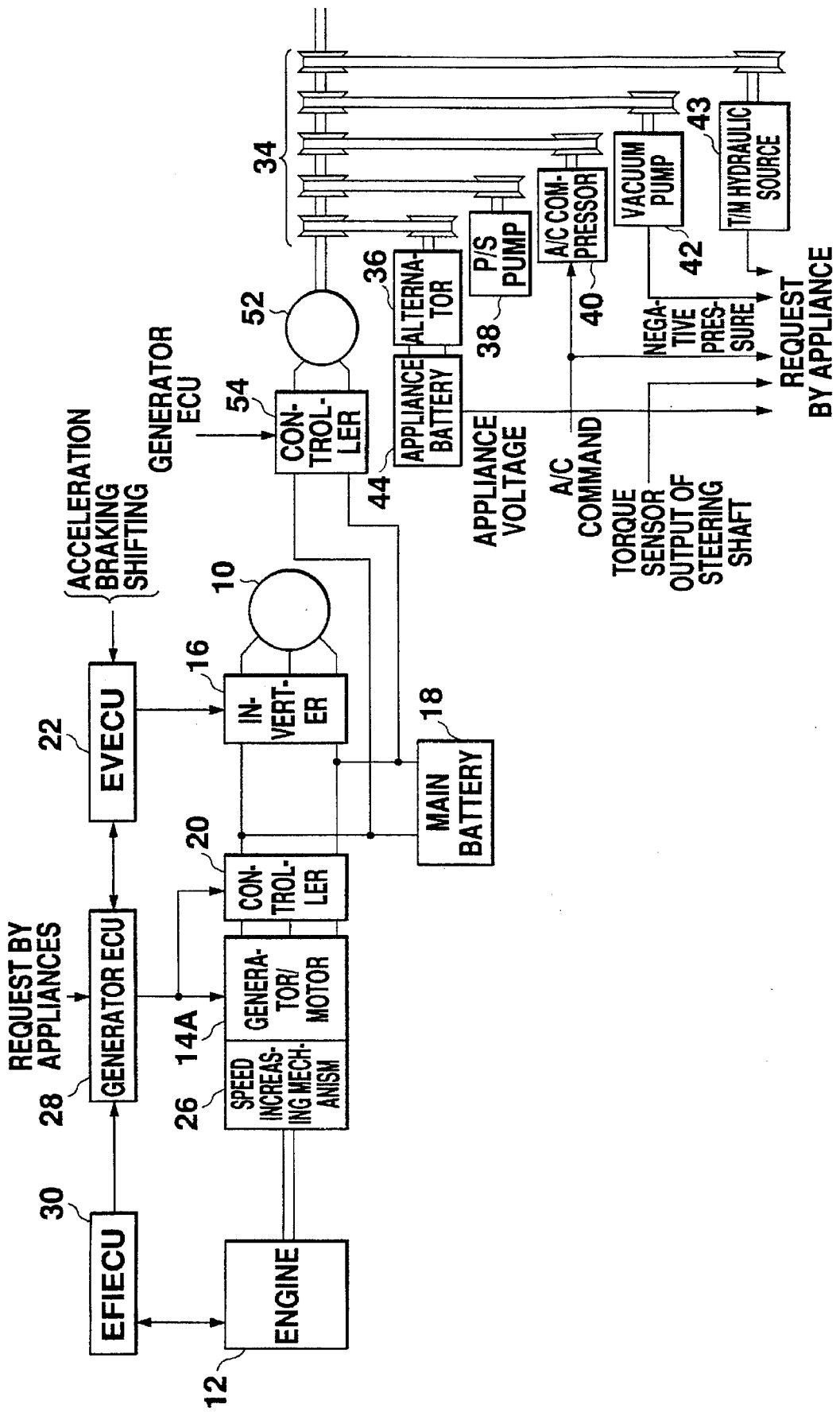
FIG. 12 is a block diagram showing a system structure of a SHV in accordance with the third embodiment.
Figure 13:
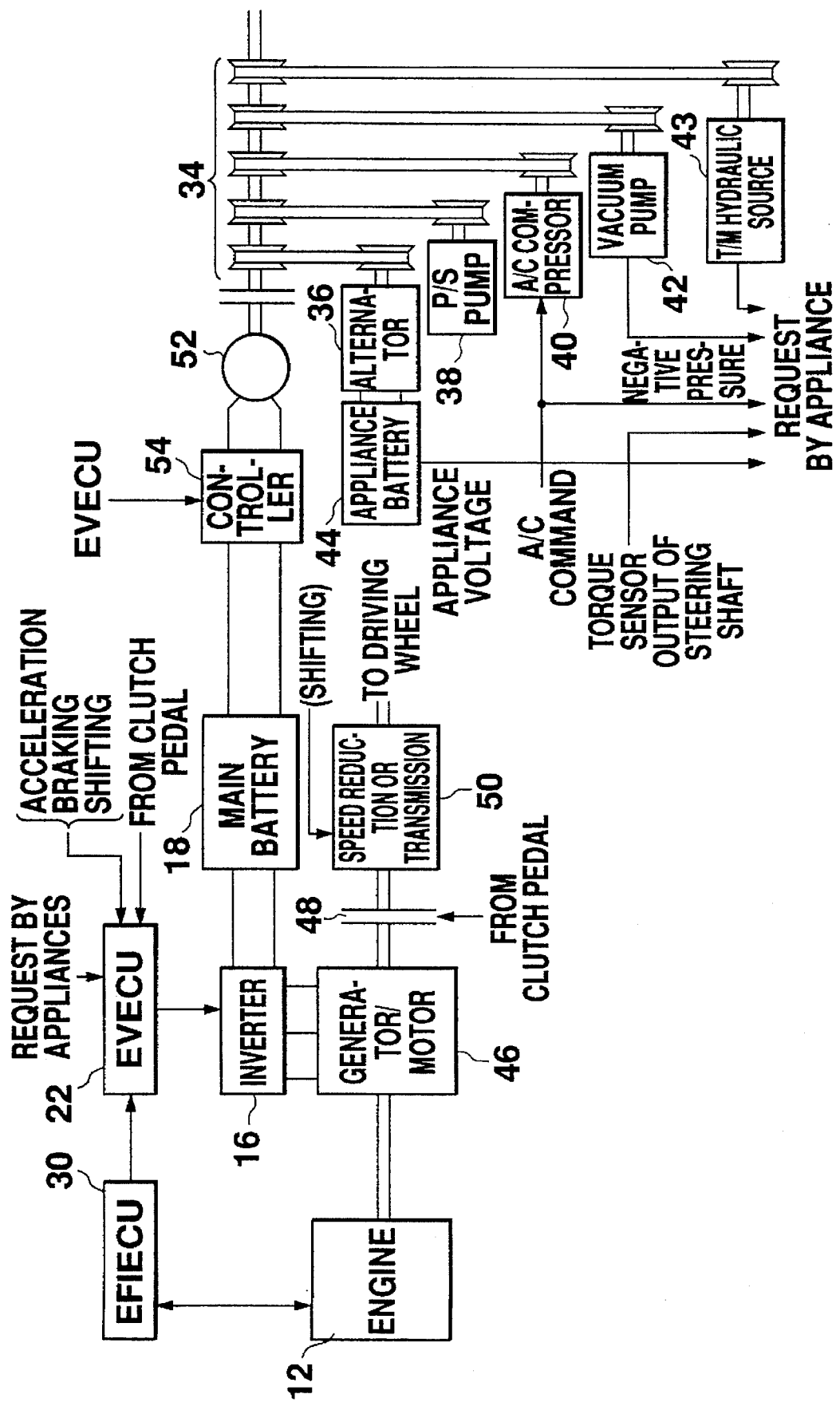
FIG. 13 is a block diagram showing a system structure of a PHV in accordance with the fourth embodiment.

FIGS. 12 and 13 show system structures of a SHV and PHV in accordance with the third and fourth embodiments, respectively. In these embodiments, an appliance driving motor 52 and a controller 54 for the motor 52 are provided to drive the appliances, such as an alternator 36, via transmission mechanism 34. On the other hand, the clutch 24 and clutch controlling unit 32, which were used in the first and second embodiments, are removed. The appliance driving motor 52 receives a driving power supply from the main battery 18. The controller 54 is constructed as a switch or chopper circuit, and is controlled by the generator ECU 28 (in the third embodiment) or EVECU 22 (in the forth embodiment).

Figure 14A:
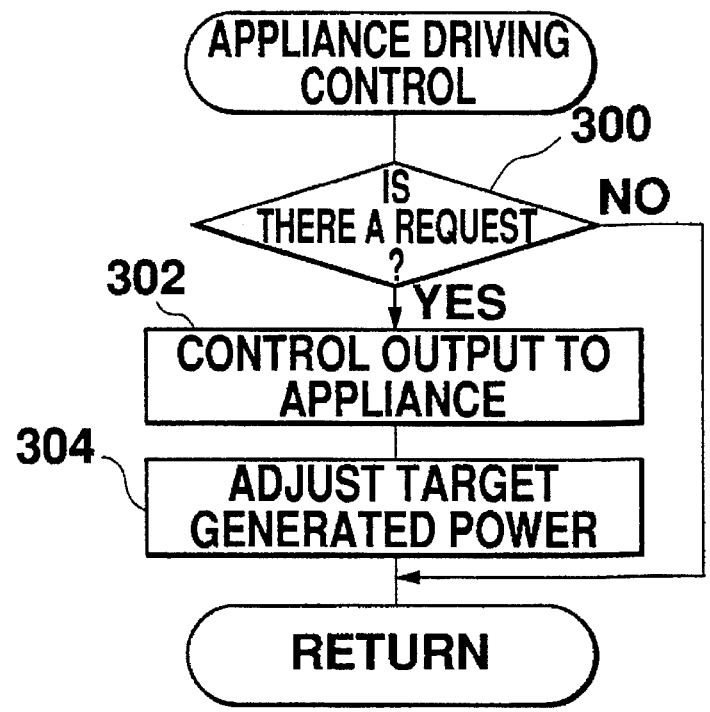
FIG. 14A is a flow chart showing an operational example of the generator ECU used in the third embodiment.
Figure 14B:
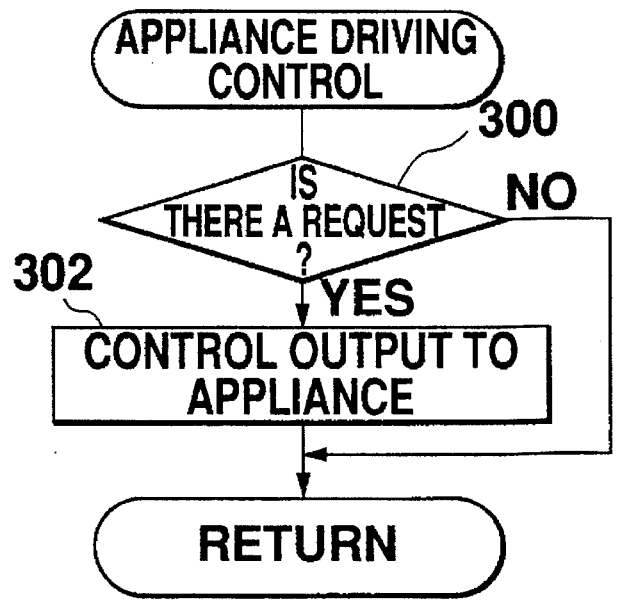
FIG. 14B is a flow chart showing an operational example of the EVECU used in the fourth embodiment.

FIGS. 14A and 14B show flow of operations of the generator ECU 28 (for SHV in the third embodiment) and the EVECU 22 (for PHV in the fourth embodiment). As is apparent from these drawings, the generator ECU 28 or EVECU 22 detect whether or not there is a request for driving the appliance (300), and supply a signal to the controller 54 to control the output to the appliances in accordance with the request (302). Differing from the first and second embodiments, it is not necessary to consider the behavior of the engine 12 or driving wheels for this control operation. Namely, each of the appliances is driven regardless of the driving condition of the engine 12 or driving wheels, and therefore, each appliance can be driven even when the engine 12 is stopped. Also, since it is no longer necessary to drive the engine 12 only for operating the appliances, the engine efficiency is improved while preventing engine noise during parking or vehicle stop. Thus, a hybrid vehicle having low fuel consumption and emission and high engine efficiency can be achieved.

In the third embodiment, the generator/motor 14 used in the first embodiment is displaced by a generator 14A, because in this embodiment it is not necessary to carry out actions for mechanically driving the appliances using a motor function. However, the generator/motor 14 can of course be used in the third embodiment, which allows the engine 12 to be driven by the generator/motor 14.

As is shown in FIG. 14A (third embodiment), the generator ECU 28 adjusts a target power (i.e. target value of the generated power of the generator 14A) for controlling output to the appliances, because the driving power for the appliance driving motor 52 is supplied from the main battery 18 which discharges in response to mechanical driving of the appliances. The generator ECU 28 controls the operation of the generator 14A so as to supplement the discharge and maintain the state of charge of the main battery 18 in good condition.

Although all of the appliances, such as the alternator 36, P/S pump 38, A/C compressor 40, vacuum pump 42, hydraulic source 43 have been described as being operative by mechanical output of the engine 12 or generator/motor 14 or 46, some of them can be adapted to be driven by generated power from the generator/motor 14 or 46, or by discharged output of the main battery 18 or appliance battery 44. Stopping of the engine 12 may be detected by monitoring the generated output from the alternator 36.

It should be noted that the present invention is not specifically limited to the illustrated embodiments, but embraces all such modified forms thereof as fall within the scope of the invention.

What is claimed is:

1. A hybrid vehicle comprising:

an engine having an engine shaft;

a rotational electrodynamic unit having a shaft, the shaft being coupled with the engine shaft;

first connection/disconnection means for connecting and disconnecting shaft-coupling between the engine and the rotational electrodynamic unit;

appliance driving means for driving at least one appliance mounted in the hybrid vehicle, each said at least one appliance having an appliance shaft, said appliance driving means being provided on the shaft of the rotational electrodynamic unit and located between the first connection/disconnection means and the rotational electrodynamic unit, thereby transmitting mechanical output from the engine to the appliance shaft when the first connection/disconnection means is closed, while transmitting mechanical output from the rotational electrodynamic unit to the appliance shaft when the first connection/disconnection means is open;

a battery for supplying a driving power to the rotational electrodynamic unit; and control means for controlling the state of charge of the battery while controlling the engine, the rotational electrodynamic unit and the appliance driving means.

2. The hybrid vehicle according to claim 1, further comprising controller means for controlling at least the rotational electrodynamic unit, said controller means including means for opening the first connection/disconnection means in response to stopping of the engine, and motor operation means for operating the rotational electrodynamic unit as a motor when the first connection/disconnection means is open.

3. The hybrid vehicle according to claim 2, further comprising second connection/disconnection means for connecting and disconnecting shaft-coupling between the rotational electrodynamic unit and driving wheels, wherein said motor operation means includes means for operating the rotational electrodynamic unit as a motor on condition that the second connection/disconnection means is open when the first connection/disconnection means is open.

4. The hybrid vehicle according to claim 3, wherein said motor operation means includes means for operating the rotational electrodynamic unit as a motor on condition that operation of the appliance is required when the first connection/disconnection means is open.

5. The hybrid vehicle according to claim 2, wherein said motor operation means includes means for operating the rotational electrodynamic unit as a motor on condition that operation of the appliance is required when the first connection/disconnection means is open.

6. The hybrid vehicle according to claim 1, wherein the first connection/disconnection means includes clutch which is opened in response to cessation of lubricating oil circulation and is closed in respond to commencement of the lubricating oil circulation.

7. A hybrid vehicle having an engine and a vehicle driving motor, the combination of which, or either of which, is used as a source of energy for driving the hybrid vehicle, comprising:

the engine;

the vehicle driving motor;

a battery for supplying electric power to the vehicle driving motor;

an appliance driving motor for mechanically driving at least one appliance mounted in the hybrid vehicle independently from driving wheels, the appliance driving motor being driven by electric power supply from the battery; and means for controlling at least one of the engine and vehicle driving motor to drive the hybrid vehicle, wherein the means for controlling comprises means for monitoring a status of the at least one appliance mounted in the hybrid vehicle and means for controlling the appliance driving motor based on the status of the at least one appliance, wherein a status of at least one appliance and a state of charge of the battery are monitored, thereby controlling the vehicle driving motor and the appliance driving motor.

* * * * *